United States Patent

Komatsu et al.

[11] Patent Number: 5,312,883
[45] Date of Patent: May 17, 1994

[54] WATER-SOLUBLE POLYMER SENSITIVE TO SALT

[75] Inventors: Masanori Komatsu; Ikuko Toki, both of Tokyo, Japan

[73] Assignee: Lion Corporation, Tokyo, Japan

[21] Appl. No.: 971,572

[22] Filed: Nov. 5, 1992

[30] Foreign Application Priority Data

Nov. 7, 1991 [JP] Japan ................... 3-291704

[51] Int. Cl.$^5$ ............................................. C08F 20/10
[52] U.S. Cl. ............................................. 526/318.44
[58] Field of Search ........................... 526/318.44

[56] References Cited

U.S. PATENT DOCUMENTS

| | | | |
|---|---|---|---|
| 2,795,564 | 6/1957 | Conn et al. | 526/318.44 |
| 2,945,013 | 7/1960 | Ott | 526/318.44 |
| 3,317,493 | 5/1967 | Selby | 526/318.44 |
| 3,890,292 | 6/1975 | Bohme et al. | 526/318.44 |
| 3,959,237 | 5/1976 | Blank | 526/318.44 |
| 4,062,817 | 12/1977 | Westerman | 526/318.44 |
| 4,085,264 | 4/1978 | Seib et al. | 526/318.44 |

FOREIGN PATENT DOCUMENTS

| | | | |
|---|---|---|---|
| 3022870 | 1/1982 | Fed. Rep. of Germany | 526/318.44 |
| 50-52371 | 5/1975 | Japan . | |
| 61-43607 | 3/1986 | Japan | 526/318.44 |
| 63-139906 | 6/1988 | Japan . | |
| 3-174417 | 7/1991 | Japan . | |

Primary Examiner—Joseph L. Schofer
Assistant Examiner—N. Sarofim
Attorney, Agent, or Firm—Burns, Doane, Swecker & Mathis

[57] ABSTRACT

A water-soluble polymer which is soluble in tap water, but insoluble in an aqueous solution containing 0.5% or more of a neutral inorganic salt, which is a copolymer of:

(A) 30 to 75% by weight of acrylic acid,
(B) 5 to 30% by weight of a vinyl monomer represented by the following general formula [1]:

$$CH_2=C(R)COOR^1 \qquad [1]$$

wherein R represents a hydrogen atom or a methyl group; and $R^1$ represents an alkyl group having 8 to 12 carbon atoms, and (C) 20 to 40% by weight of a vinyl monomer represented by the following general formula [2]:

$$CH_2=C(R^2)COOR^3 \qquad [2]$$

wherein $R^2$ represents a hydrogen atom or a methyl group; and $R^3$ represents an alkyl group having 2 to 4 carbon atoms and in which not more than 50 molar % of the repeating units of derived from the acrylic acid is in the form of a salt. When the polymer is used as a binder for a nonwoven fabric or paper, it exhibits satisfactory strength and permeability to a body fluid when the resultant product is wet with body fluid.

9 Claims, No Drawings

WATER-SOLUBLE POLYMER SENSITIVE TO SALT

BACKGROUND OF THE INVENTION

The present invention relates to a polymer whose solubility in water changes depending on even a very slight difference in the concentration of a salt contained in the water and more specifically to a salt-sensitive polymer which is soluble in a usual tap water but is insoluble in an aqueous solution containing not less than 0.5% by weight of a neutral inorganic salt comprising a monovalent ion such as NaCl, KCl or NaBr.

It has been known that when an inorganic salt which is an electrolyte is added in an increasing amount to an aqueous solution of a water-soluble polymer, the polymer is salted out to form a precipitate. On the other hand, it has also been known that salts are contained in human body fluids such as urine in an amount of at least about 0.5% by weight. It is supposed, therefore, that when a non-woven fabric or paper is bonded with a binder comprising a polymer which is soluble in tap water but insoluble in an aqueous solution containing salts in an amount of 0.5% by weight, the resulting product will have a sufficient strength when it is brought into contact with a body fluid, but the product will be easily dispersed in a flush toilet. Under these circumstances, investigations are made on the use of the salt-sensitive polymer as a binder for various products to be thrown into the flush toilet or the like.

Among the salt-sensitive polymers, anionic polymers such as sodium salts of polyacrylic acid and carboxymethyl cellulose are less sensitive to an increase in the concentration of an electrolyte in an aqueous solution. Such anionic polymers become insoluble in, for instance, an aqueous solution of common salt when the common salt concentration is increased to as high as 4 to 5% by weight or above. Although Japanese Patent Unexamined Publication (hereinafter referred to as "J. P. KOKAI") No. Sho 50-52371 discloses an alkali cellulose ether sulfate, the difference between the solubility of this sulfate in tap water and that in 0.5 wt. % aqueous common salt solution is not clearly described in this patent. Moreover, since the alkali cellulose ether sulfate is prepared by sulfating a cellulose derivative such as ethyl cellulose, the polymer used as the starting material is relatively expensive.

As for a salt-sensitive polymer for solving the foregoing problems, J. P. KOKAI No. Sho 63-139906 discloses a partially neutralized copolymer of (meth)acrylic acid and a (meth)acrylic ester as the polymer soluble in tap water but insoluble in an aqueous solution of common salt having a concentration of not less than 0.5% by weight. However, such a partially neutralized copolymer has a high adhesion. J. P. KOKAI No. Hei 3-174417 discloses a partially neutralized copolymer of (meth)acrylic acid and an aryl or cycloalkyl (meth)acrylate; or a partially neutralized copolymer of (meth)acrylic acid and a styrene derivative which copolymers have no problem of the adhesion. However, non-woven fabrics or papers prepared by using such a polymer as the binder do not have satisfactory strength and permeability to the body fluid practically demanded when they are wetted with the body fluid.

SUMMARY OF THE INVENTION

A primary object of the present invention is to provide a salt-sensitive polymer which is soluble in an ordinary tap water but insoluble in water containing at least 0.5% by weight of a neutral inorganic salt comprising a monovalent ion such as NaCl, KCl or KBr and which has satisfactory strength and permeability to body fluid when it is used as a binder for non-woven fabric or paper.

This and other objects of the present invention are apparent from the following description and Examples.

The present invention has been completed on the basis of a finding that when acrylic acid is copolymerized with an alkyl (having 8 to 12 carbon atoms) ester of (meth)acrylic acid and an alkyl (having 2 to 4 carbon atoms) ester of (meth)acrylic acid and then the acrylic acid is partially neutralized, a copolymer which is soluble in an ordinary tap water but insoluble in water containing at least 0.5% by weight of a neutral inorganic salt comprising a monovalent ion is obtained; and that by controlling the ratio of these two alkyl ester monomers, a binder for non-woven fabrics or papers sufficient wet strength and permeability to body fluid can be obtained.

According to the present invention, there is provided a water-soluble polymer which is soluble in tap water, but insoluble in an aqueous solution containing 0.5% or more of a neutral inorganic salt, which is a copolymer of:

(A) 30 to 75% by weight of acrylic acid,
(B) 5 to 30% by weight of a vinyl monomer represented by the following general formula [1]:

  $\quad$ [1]

$$CH_2=C(R)COOR^1$$

wherein R represents a hydrogen atom or a methyl group; and $R^1$ represents an alkyl group having 8 to 12 carbon atoms, and (C) 20 to 40% by weight of a vinyl monomer represented by the following general formula [2]:

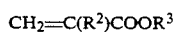  $\quad$ [2]

$$CH_2=C(R^2)COOR^3$$

wherein $R^2$ represents a hydrogen atom or a methyl group; and $R^3$ represents an alkyl group having 2 to 4 carbon atoms and in which not more than 50 molar % of the repeating units derived from the acrylic acid is in the form of a salt.

DETAILED DESCRIPTION OF THE PREFERRED EMBODIMENTS

The amount of acrylic acid (A) used in the present invention is 30 to 75% by weight (hereinafter referred to simply as "%"), particularly preferably 40 to 65%. When the amount of the component (A) exceeds 75%, the strength of the copolymer is insufficient when it is wet with a body fluid and, on the contrary, when it is below 30%, the dispersibility in water is insufficient.

The (meth)acrylic esters (B) of the general formula [1] used in the present invention include 2-ethylhexyl (meth)acrylate and lauryl (meth)acrylate. These can be used singly or in combination. The amount of the (meth)acrylic ester (B) used is 5 to 30%, particularly preferably 10 to 25%. When the amount of the (meth) acrylic ester (B) used in the present invention exceeds 30%, the water-repellency of the copolymer is increased which lowers the permeability to the liquid. On the contrary, when it is below 5%, a satisfactory product cannot be obtained, since the strength of the copolymer is insufficient when it is wet with the body fluid, though the permeation to the liquid is good.

The (meth)acrylic esters (C) of the general formula [2] used in the present invention include ethyl (meth)acrylate, isopropyl (meth)acrylate and n-butyl (meth)acrylate. These can be used singly or in combination. the amount of the component (C) used is 20 to 40%, particularly preferably 25 to 35%. When the amount of this component exceeds 40%, the permeability to the liquid is reduced and, on the contrary, when it is below 20%, the strength of the copolymer is insufficient when it is wet with the body fluid.

In the present invention, the proportion of the monomers is limited in the above-described range and the acrylic acid part of the copolymer is partially neutralized to control the solulbility of the polymer in water. When the degree of neutralization is insufficient, the polymer is insoluble even in tap water and, on the contrary, when it exceeds 50 molar %, it is soluble even in water containing 0.5% of a salt unfavorably. The method for the neutralization is not particularly limited. The polymerization can be followed by the neutralization or, alternatively, the monomer can be neutralized prior to the polymerization.

The degree of neutralization of the component (A) is preferably not higher than 50 molar %, particularly preferably not higher than 40 molar %, i.e. 1 to 40 molar %, most preferably 5 to 35 molar %. Examples of the alkalis usable for the neutralization include NaOH, KOH, LiOH, inorganic salts such as $Na_2CO_3$; and amines such as monoethanolamine, diethanolamine, triethanolamine, diethylaminoethanol, ammonia, trimethylamine and morpholine. Among them, preferred are NaOH, KOH, ethanolamines and a combination of an ethanolamine with NaOH or KOH.

The polymer of the present invention is preferably prepared by an ordinary solution polymerization method. Examples of the polymerization solvents include lower alcohols such as methanol, ethanol and 2-propanol; solvent mixtures of these lower alcohols with water; lower ketones such as acetone and methyl ethyl ketone; and solvent mixtures of these lower ketones with water. A polymerization initiator usable in the present invention is not particularly limited as long as it is soluble in the solvent used. Examples of the polymerization initiators include 2,2'-azobisisobutyronitrile, 2,2'-azobis(2-methylbutyronitrile), 2,2'-azobis(2,4-dimethylvaleronitrile), 2,2'-azobis(2-amidinopropane) dihydrochloride and 2,2'-azobis(N,N-dimethyleneisobutylamidine). The amount of the polymerization initiator ranges from 0.01 to 5% by weight based on the monomers. The polymerization temperature which varies depending on the polymerization solvent ranges from 40° to 90° C. and the polymerization time ranges from 1 to 7 hours.

The molecular weight is not particularly limited. However, from the viewpoints of the properties of the non-woven fabrics to which the polymer is to be applied and the workability during the application, the weight-average molecular weight is preferably 10,000 to 1,500,000, particularly preferably 50,000 to 800,000.

According to the present invention, polymers soluble in tap water but insoluble in water containing at least 0.5% of a neutral inorganic salt comprising a monovalent ion can be easily obtained. Non-woven fabrics and papers containing the polymer as the binder have sufficient strength and permeation to a body fluid when they are brought into contact with body fluid. Another characteristic feature of the present invention is that since the binder is dissolved in water in a flush toilet, the non-woven fabrics and papers are easily dispersed.

Therefore, the polymer of the present invention is widely usable as a binder or sheet for paper diapers, sanitary goods, surgical bandages and wet tissues to be thrown into a flush toilet.

The following Examples will further illustrate the present invention.

EXAMPLE 1

55 g of acrylic acid, 15 g of 2-ethylhexyl acrylate, 30 g of butyl acrylate, 106 g of acetone and 38 g of distilled water were fed in a 500 ml four-necked separable flask provided with a stirrer, reflux condenser and nitrogen-introducing tube to obtain a homogeneous solution. Then nitrogen gas was introduced into the flask through the nitrogen-introducing tube under stirring. 20 minutes after, a solution of a polymerization initiator prepared by dissolving 0.88 g of 2,2'-azobis(2-amidinopropane) dihydrochloride in 5 g of distilled water was added to the resultant solution to initiate the polymerization reaction under heating in a water bath maintained at 70° C. After conducting the polymerization at 70° C. for 6 hours in nitrogen gas stream, the reaction mixture was cooled to room temperature and then neutralized by addition of 7.65 g of 48 wt. % aqueous sodium hydroxide solution and 380 g of distilled water (neutralization rate: 12 molar % based on acrylic acid; weight-average molecular weight: 300,000). The solids content of the resultant polymer solution as determined with a Kett moisture meter was found to be 15.5%.

EXAMPLE 2

The polymerization was conducted in the same manner as that of Example 1 except that 50 g of acrylic acid, 25 g of 2-ethylhexyl acrylate and 25 g of butyl acrylate were used as the monomers and 8.7 g of 48% aqueous sodium hydroxide solution was used as the neutralizer (neutralization rate: 15 molar % based on acrylic acid; weight-average molecular weight: 270,000). The solids content was 15.7%.

EXAMPLE 3

The polymerization was conducted in the same manner as that of Example 1 except that 65 g of acrylic acid, 10 g of lauryl acrylate and 25 g of ethyl acrylate were used as the monomers and 10.5 g of 48% aqueous sodium hydroxide solution was used as the neutralizer (neutralization rate: 14 molar % based on acrylic acid; weight-average molecular weight: 460,000). The solids content was 15.6%.

EXAMPLE 4

The polymerization was conducted in a water bath at 60° C. in the same manner as that of Example 1 except that 70 g of acrylic acid, 10 g of 2-ethylhexyl methacrylate and 20 g of ethyl methacrylate were used as the monomers, 228 g of acetone was used as the polymerization solvent and an initiator solution prepared by dissolving 0.4 g of 2,2'-azobisisobutyronitrile in 5 g of acetone was used. After completion of the polymerization, 10.9 g of 50% aqueous KOH solution as the neutralizer and 300 g of distilled water were added to the reaction mixture (neutralization rate: 10 molar % based on acrylic acid; weight-average molecular weight: 550,000). The solids content was 15.4%.

EXAMPLE 5

The polymerization was conducted in the same manner as that of Example 1 except that 40 g of acrylic acid, 20 g of 2-ethylhexyl acrylate and 40 g of butyl acrylate were used as the monomers and 11.6 g of 48% aqueous sodium hydroxide solution was used as the neutralizer (neutralization rate: 25 molar % based on acrylic acid; weight-average molecular weight: 240,000). The solids content was 15.8%.

EXAMPLE 6

The polymerization was conducted in the same manner as that of Example 1 except that 35 g of acrylic acid, 25 g of 2-ethylhexyl acrylate and 40 g of butyl acrylate were used as the monomers and 12.1 g of 48% aqueous sodium hydroxide solution was used as the neutralizer (neutralization rate: 30 molar % based on acrylic acid; weight-average molecular weight: 190,000). The solids content was 15.7%.

EXAMPLE 7

The polymerization was conducted in the same manner as that of Example 1 except that 65 g of acrylic acid, 15 g of 2-ethylhexyl acrylate and 20 g of butyl acrylate were used as the monomers and 5.2 g of 48% aqueous sodium hydroxide solution was used as the neutralizer (neutralization rate: 7 molar % based on acrylic acid; weight-average molecular weight: 390,000). The solids content was 15.8%.

COMPARATIVE EXAMPLE 1

The polymerization was conducted in the same manner as that of Example 1 except that 85 g of acrylic acid, 10 g of 2-ethylhexyl acrylate and 5 g of butyl acrylate were used as the monomers and 3.94 g of 48% aqueous sodium hydroxide solution was used as the neutralizer (neutralization rate: 4 molar % based on acrylic acid, weight average molecular weight: 520,000). The solids content was 15.5%.

COMPARATIVE EXAMPLE 2

The polymerization was conducted in a water bath at 60° C. in the same manner as that of Example 1 except that 35 g of acrylic acid and 65 g of 2-ethylhexyl acrylate were used as the monomers and and initiator solution prepared by dissolving 0.69 g of azobisisobutyronitrile in 10 g of methanol was used. The solids content was 37.8%. 30 g of the polymer solution thus obtained was taken. 6.7 g of 10% aqueous monoethanolamine solution and 2.2 g of 10% aqueous sodium hydroxide solution as neutralizers and 80 g of water were added thereto (neutralization rate: 30 molar % based on acrylic acid; weight-average molecular weight: 14,000).

COMPARATIVE EXAMPLE 3

The polymerization was conducted in the same manner as that of Example 1 except that 40 g of acrylic acid, 40 g of 2-ethylhexyl acrylate and 20 g of butyl acrylate were used as the monomers and 11.6 g of 48% aqueous sodium hydroxide solution was used as the neutralizer (neutralization rate: 25 molar % based on acrylic acid; weight-average molecular weight: 180,000). The solids content was 15.8%.

COMPARATIVE EXAMPLE 4

The polymerization was conducted in the same manner as that of Example 1 except that 50 g of acrylic acid, 30 g of butyl acrylate and 20 g of styrene were used as the monomers and 26.0 g of 48% aqueous sodium hydroxide solution was used as the neutralizer (neutralization rate: 45 molar % based on acrylic acid; weight-average molecular weight: 250,000). The solids content was 15.5%.

COMPARATIVE EXAMPLE 5

The polymerization was conducted in the same manner as that of Example 1 except that 25 g of acrylic acid, 30 g of 2-ethylhexyl acrylate and 45 g of butyl acrylate were used as the monomers and 16.0 g of 48% aqueous sodium hydroxide solution was used as the neutralizer (neutralization rate: 55 molar % based on acrylic acid; weight-average molecular weight: 80,000). The solids content was 16.0%.

COMPARATIVE EXAMPLE 6

The polymerization was conducted in the same manner as that of Example 1 except that 65 g of acrylic acid and 35 g of butyl acrylate were used as the monomers and 4.5 g of 48% aqueous sodium hydroxide solution was used as the neutralizer (neutralization rate: 6 molar % based on acrylic acid; weight-average molecular weight: 440,000). The solids content was 16.0%.

Preparation of non-woven fabric

A web was formed from rayon as the base fiber by carding. The web was then subjected to a water needling treatment and dried to obtain a web having a basis weight of 30 g/m². Then 1 wt. % aqueous solution of one of the above-described polymers used as the binder was applied in an amount of 3% based to the base fiber by a spray method. The fiber was then dried to obtain the non-woven fabric.

Wet strength

The non-woven fabric was cut into pieces of 5 cm×15 cm to obtain the sample. The sample was immersed in an artificial urine having a composition which will be given below for 1 min, taken out and drained with a filter paper so that the water content thereof would be 150%. The strength of the sample thus treated was determined with a tensile strength tester (MODEL GAC-100 mfd. by Toyo Bouldline Co., LTD.) at a chuck distance of 10 cm and tensile strength of 100 mm/min.

Artificial urine 1.0 wt. % of NaCl, 0.1 wt. % of $CaCl_2$, 0.07 wt. % of $MgCl_2$ and the balance of water.

Permeability to liquid

The non-woven fabric was placed on a sheet of tissue paper. One drop of the artificial urine was dropped thereon by means of a dropping pipet from a height of about 15 cm and the time necessary for the complete passing of the liquid through the non-woven fabric was determined.

◯: within 2 min, X: longer than 3 min.

Dispersibility in water 500 ml of tap water was fed into a 1,000 ml cylindrical vessel with a lid. Pieces of the non-woven fabric having a size of 6 cm×6 cm were thrown into the water. The cylindrical vessel was shaken by means of a shaker at 300 reciprocations/min for 5 minutes and then the water dispersion in the pieces of the non-woven fabric was observed.

○: complete dispersion, △: insufficient dispersion, X: no dispersion.

The results are summarized in Table 1.

TABLE 1

| | Composition (wt %) | Wet strength (g/10 cm) | Permeability to liquid | Water dispersibility |
|---|---|---|---|---|
| 1 | AAc/2EHA/BA = 55/15/30 | 390 | ○ | ○ |
| 2 | AAc/2EHA/BA = 50/25/25 | 410 | ○ | ○ |
| 3 | AAc/LA/EA = 65/10/25 | 370 | ○ | ○ |
| 4 | AAc/2EHMA/EMA = 70/10/20 | 340 | ○ | ○ |
| 5 | AAc/2EHA/BA = 40/20/40 | 350 | ○ | ○ |
| 6 | AAc/2EHA/BA = 35/25/40 | 330 | ○ | ○ |
| 7 | AAc/2EHA/BA = 65/15/20 | 350 | ○ | ○ |
| 1* | AAc/2EHA/BA = 85/10/5 | 180 | ○ | ○ |
| 2* | AAc/2EHA = 35/65 | 380 | X | △ |
| 3* | AAc/2EHA/BA = 40/40/20 | 400 | X | △ |
| 4* | AAc/BA/St = 50/30/20 | 320 | X | ○ |
| 5* | AAc/2EHA/BA = 25/30/45 | 280 | X | △ |
| 6* | AAc/BA = 65/35 | 190 | ○ | ○ |

Note:
AAc: acrylic acid, 2EHA: 2-ethylhexyl acrylate, BA: butyl acrylate, LA: lauryl acrylate, EA: ethyl acrylate, 2EHMA: 2-ethylhexyl methacrylate, EMA: ethyl methacrylate, st: styrene.
Symbol "*" indicates a Comparative Example.

We claim:

1. A water-soluble polymer which is soluble in tap water, but insoluble in an aqueous solution containing 0.5% or more of a neutral inorganic salt, which is a copolymer of:
   (A) 30 to 75% by weight of acrylic acid,
   (B) 5 to 30% by weight of a vinyl monomer represented by the following general formula [1]:

$$CH_2=C(R)COOR^1 \quad [1]$$

wherein R represents a hydrogen atom or a methyl group; and $R^1$ represents an alkyl group having 8 to 12 carbon atoms, and
   (C) 20 to 40% by weight of a vinyl monomer represented by the following general formula [2]:

$$CH_2=C(R^2)COOR^3 \quad [2]$$

wherein $R^2$ represents a hydrogen atom or a methyl group; and
   $R^3$ represents an alkyl group having 2 to 4 carbon atoms, said copolymer having a weight average molecular weight of 50,000 to 800,000 and having not more than 50 molar % of the repeating units derived from the acrylic acid in the form of a salt.

2. The water-soluble polymer of claim 1 wherein component (B) is 2-ethylhexyl (meth) acrylate or lauryl (meth) acrylate.

3. The water-soluble polymer of claim 1 wherein component (C) is selected from the group consisting of ethyl (meth) acrylate, isopropyl (meth) acrylate and n-butyl (meth) acrylate.

4. The water-soluble polymer of claim 1 wherein the amount of component (A) is 40 to 65 weight %.

5. The water-soluble polymer of claim 1 wherein the amount of component (B) is 10 to 25 weight %.

6. The water-soluble polymer of claim 1 wherein the amount of component (C) is 25 to 35 weight %.

7. The water-soluble polymer of claim 1 wherein 1 to 40 molar % of the repeating units of derived from the acrylic acid is in the form of a salt.

8. The water-soluble polymer of claim 1 wherein 5 to 35 molar % of the repeating units of derived from the acrylic acid is in the form of a salt.

9. The water-soluble polymer of claim 1 wherein the copolymer is a copolymer of (A) 40 to 65% by weight of acrylic acid, (B) 10 to 25% by weight of 2-ethylhexyl (meth) acrylate or lauryl (meth) acrylate, and (C) 25 to 35% by weight of (meth) acrylate selected from the group consisting of ethyl (meth) acrylate, isopropyl (meth) acrylate and n-butyl (meth) acrylate and 1 to 40 molar % of the repeating units of derived from the acrylic acid is in the form of a salt.

* * * * *